April 13, 1948.    S. M. MERCIER    2,439,574
JARRING MECHANISM FOR CONVEYOR FLIGHTS
Filed April 24, 1946
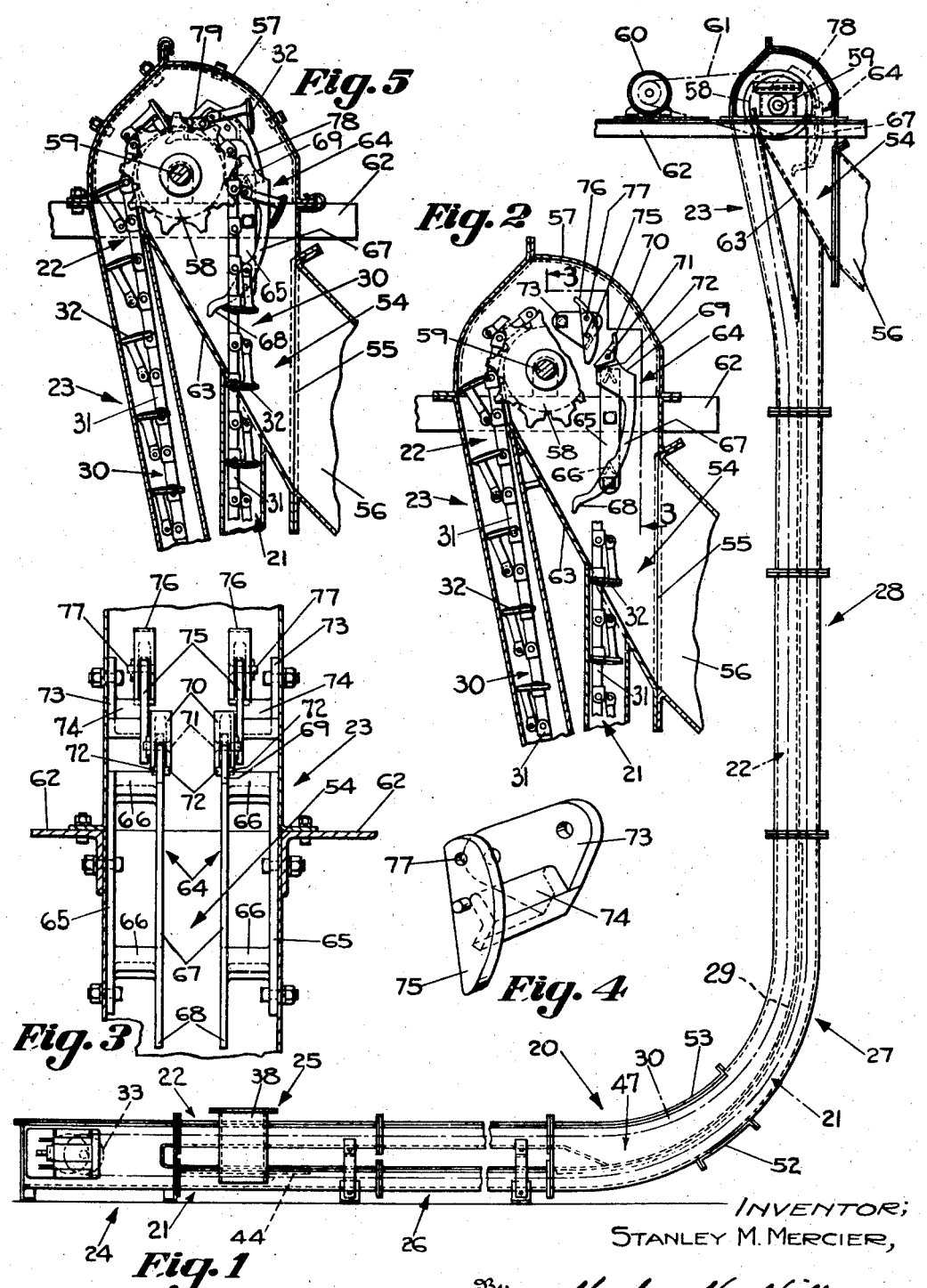
INVENTOR;
STANLEY M. MERCIER,
By
Attorney.

Patented Apr. 13, 1948

2,439,574

UNITED STATES PATENT OFFICE 2,439,574

JARRING MECHANISM FOR CONVEYER FLIGHTS

Stanley M. Mercier, Bexley, Ohio, assignor to The Jeffrey Manufacturing Company, a corporation of Ohio Original application June 25, 1942, Serial No. 448,395. Divided and this application April 24, 1946, Serial No. 664,479½

7 Claims. (Cl. 198—170)

My invention relates to conveyers and in its broad aspect to conveyers in which there is included a draft means having individual members attached thereto for conveying materials. In a more limited aspect my invention relates to that type of scraper conveyer which includes an enclosing casing having a head or discharge section through which operates a draft means having flights thereon, a number of the features of the invention being particularly pertinent to conveyers of this type.

An object of my invention is to provide an improved conveyer in which material is discharged from the individual conveyer members of the draft means by jarring action or actions.

Another object of my invention is to provide an improved conveyer wherein the conveying elements of the draft means are abruptly diverted in their path of travel thereby jarring material from the conveying elements.

In carrying out the foregoing object it is another object of my invention to provide successive cam means for abruptly diverting the path of the conveying elements thereby causing the elements to be given a hammerlike blow for jarring material from the conveyer elements.

Another object of my invention is to provide an improved conveyer having a head or discharge section in which there is a head shaft over which a draft means and its conveyer elements travel and in which there is positioned adjacent the head shaft and above a discharge chute, means for causing the conveyer elements to be tilted to a discharge position and then to be given hammerlike blows for cleaning material from the conveyer elements.

In carrying out the foregoing object it is yet another object of my invention to utilize successive cams for tilting the conveyer elements to discharge positions and for abruptly releasing the conveyer elements, one cam to the succeeding cam, and then to their normal positions wherein the cams provide for a reversal of direction of travel of the conveyer draft means and conveyer elements.

Other and further objects of the invention will appear hereinafter, the novel features and combinations being set forth in the appended claims.

In the accompanying drawings,

Fig. 1 is a side elevational view of a conveyer including my invention;

Fig. 2 is a sectional elevational view of a portion of the head or discharge section of the conveyer showing one form of cam mechanism constituting a feature of my invention;

Fig. 3 is a section taken on line 3—3 of Fig. 2, looking in the direction of the arrows;

Fig. 4 is an enlarged perspective view of one of the cams; and

Fig. 5 is a view similar to Fig. 2 showing another cam structure.

This application is a division of my abandoned application, Serial No. 448,395, filed June 25, 1942, for Conveyer. It is to be understood that the construction and operation of the conveyer of this application follows that of my parent application, above identified, and that only the subject matter pertinent to the present invention is discussed in detail herein.

Referring particularly to Fig. 1 of the accompanying drawings, there is illustrated a typical conveyer incorporating the features of my invention. Said conveyer is generally of L-shaped construction and comprises a totally enclosing housing or casing 20 including a working run or leg 21 and return run or leg 22. Said housing or casing 20 is made up of a plurality of sections of which the principal sections are a head or discharge section 23, a tail section 24, a feed section 25, one or more horizontal sections 26, a curved section 27 and one or more upright or vertical sections 28. The various sections 25 to 28, inclusive, are interconnected, for example, by flanges which are preferably bolted together or otherwise rigidly attached. In the major portion of the curved portion 27 and preferably throughout the vertical section 28 the housing 20 is formed as a substantial enclosing casing in which a partition extends to divide the casing into the working and return legs. The dividing partition for the curved section 27 is seen at 29. An essentially similar partition is provided in the upright sections 28. Extending through the working and return runs of the housing 20 is an endless conveyer mechanism 30 comprising an endless chain or other equivalent draft means 31 to which is attached a plurality of trailing flights 32 preferably of the substantially solid type although it is to be understood that as to certain features of my invention these flights may be of the open type. In general, the casing and the conveyer construction follow the structure disclosed in the patent to A. F. White, No. 2,170,934, dated August 29, 1939, but, as shall be evident, there are numerous improvements herein as compared with the structure of said White patent. When the flights 32 are of the solid type they are preferably notched adequately to permit appreciably lateral movement thereof with respect to the chain 31 to permit the chain 31 to move substantially along the center line of the working leg 21 as hereinafter described more completely. The tail section 24 includes a tail sprocket 33 preferably mounted upon adjustable bearings to provide for adjustment of the tension of the endless chain 31.

Attention is now directed particularly to Figs. 1, 2, 3 and 4 of the drawings and to the head section 23 of said conveyer and certain apparatus associated therewith. The bottom of the head section 23 has a common partition dividing it into the working leg portion 21 and return leg portion 22, said partition constituting in effect a continuation of partition 29. Adjacent the middle and upper portion of the head section, however, said legs 21 and 22 are separated by individual inner walls. The head section is provided adjacent the upper portion with an enlarged discharge chamber 54 which has a width slightly in excess of that of the working and return legs 21 and 22 so that the material in flowing off the flights 32 can flow freely laterally thereof as well as over the bottom edge thereof. Said discharge chamber 54 leads through a discharge opening 55 to a discharge chute 56, said chute 56 being, of course, of the same width as the chamber 54 where it is attached thereto by cooperating flanges illustrated in Fig. 2 of the drawings which may be attached together as by nuts and bolts or other attaching means. The top portion of the housing of the head section 23 is preferably removable as a whole and in addition is also preferably provided with a removable top cover 57 which permits inspection of the apparatus therein without removing the entire top. Within said head section 23 is a head drive sprocket 58 mounted upon a head shaft 59 which is driven from an electric motor 60 by appropriate speed reducing chain and sprocket drive mechanism 61. The motor 60 and head section 23 are preferably mounted upon some supporting structure such as a platform 62. It is, of course, evident that the motor 60 will drive the sprocket 58 and thus drive the endless conveyer mechanism 30 conveying material from a feed inlet adjacent a feed chute 38 and discharge the material from chamber 54 through discharge opening 55 and thence to chute 56. To insure a complete discharge of material without any return thereof to the return leg 22, the rear and bottom wall of the discharge chamber 54 includes a sloping plate or chute 63 which extends upwardly and rearwardly and terminates to the rear of the head shaft 59 and to or adjacent the upper end of the return leg 22. The upper end of the plate 63 is slotted to permit the teeth of the drive sprocket 58 to extend therethrough, since said plate extends alongside and to the rear of said sprocket 58. It is, of course, evident that any material which tends to remain on the flights 32 while traveling upwardly and around the sprocket 58 will be caught by the plate or chute 63 and discharged by it through the discharge opening 55. Also to insure a complete discharge of material which may be a little difficult to discharge from flights 32 I provide an arrangement of cams which not only tilts the flights to discharging position but also gives them at least one solid jar or hammerlike blow while at the same time providing for reverse movement of the conveyer mechanism 30. The structure of one form of cam mechanism is best seen by reference to Figs. 2, 3 and 4 of the drawings to which attention is now directed.

Removably attached to the side walls of the discharge chamber 54 of head section 23 extending inwardly in the casing and first encountered by the flights 32 is a pair of cams 64 which are positioned to swing said flights 32 to material discharging position. As illustrated best in Fig. 3 of the drawings, each of said cams 64 comprises a base 65 adapted to be bolted to a side wall of the discharge chamber 54, from which base there extends inwardly a pair of peaked cap bosses 66, said bosses 66 being peak capped to shed material. Carried upon the bosses 66 is a cam plate 67 which has a lower wing 68 which extends rearwardly, as illustrated in Fig. 2 of the drawings, a sufficient distance to insure the outer edge of the cam plate 67 contacting the rear edge of each flight 32, thereby to insure proper action of said flights 32 as they reach discharging position. The upper end of the plate 67 is curved rearwardly as illustrated at 69 so that the flight in reaching this position will tend to swing downwardly about its pivot point and contact a pivoted bifurcated cam 70 associated therewith which has a top cam surface over which the flight edges travel and has two side legs as clearly illustrated in Fig. 3 of the drawings which extend on opposite sides of the cam plate 67, the cam 70 being pivotally attached to the top of plate 67 by pivot pin 71. The plate 67 provides an outwardly extending gradual leading edge for camming the swinging flights outwardly as they approach the cam means 70 associated therewith. The plate 67 also carries stop pin means 72 which extends on opposite sides thereof and contacts the legs of the cam 70 to limit the swinging movement of the cam 70 in a counter-clockwise direction so that said cam 70 cannot move beyond the position illustrated in Fig. 2 of the drawings in said counter-clockwise direction. It is, of course, evident that the cam mechanism above described is duplicated on both sides of the discharge chamber 54 as is clearly illustrated in Fig. 3 of the drawings.

Spaced above said cam mechanism 67—70 I also provide additional duplicate cam mechanism now to be described. Said additional duplicate cam mechanism consists of a base 73 attached to a side wall of the discharge chamber 54 from which extends a boss 74 (see Figs. 3 and 4) upon which boss is mounted an integral cam plate 75 the bottom of which extends below, rearwardly, and to one side of the aforedescribed cam 70, as clearly illustrated in Figs. 2 and 3 of the drawings. To the top of plate 75 is pivotally mounted a cam 76 preferably substantially identical in structure with the above described cam 70, the legs thereof being adapted to strike on one side against the boss 74 and on the other side against a small projection on the plate 75. A pivot pin 77 pivotally mounts the cam 76 on the plate 75. In Fig. 2 of the drawings said cam 76 is illustrated in its extreme counter-clockwise position. It is evident that as the flights 32 travel upwardly to the material discharging position adjacent the opening 55 they are first caught by the wings 68 of the two cam plates 67 and are gradually swung to a material discharging position which is clearly illustrated in Fig. 5. As the flights reach the curved portion 69 of the plates 67 they swing downwardly about their pivot points and contact the two cams 70 over which they ride while moving outwardly again. When the flights swing downwardly from the upper edges of the two cams 70 they swing freely and strike the two cam plates 75 thus imparting a jarring action to said flights to remove material adhering thereto.

In traveling upwardly over the cam plates 75 and subsequent cams 76 the flights are again swung to a very efficient material discharging position and are again permitted to swing freely and are suddenly stopped by the sprocket 58 and chain 31 to thus deliver a second hammerlike blow or jarring action to each flight as it swings from the cams 76. By this time all of the material will be discharged even if it is of sticky constituency.

The pivoted cams 70 and 76 provide for free reverse movement of the conveyer flights 32 and chain 31. For example, if the conveyer mechanism 30 starts to move in reverse or clockwise direction and the bottom of a flight contacts the upper end of cam 70 or cam 76, these cams are free to pivot about their pivot points and allow the conveyer 30 to move in a reverse direction, the normal non-operating or bottom portions of said cams 70 and 76 thus providing guiding cam surfaces to guide the flights through the head section 23.

In Fig. 5 of the drawings I have shown a different form of cam arrangement. In the structure shown in Fig. 5 the cams 64 have been modified by removing the cams 70 and pins 71. In place of the cam mechanism 73—77 I have provided a pair of stationary cams 78 which do not tilt the flights quite as severely with respect to the chain as the cam 64 and do not provide the severe bumping or jarring action above described but nevertheless tilt said flights 32 to such a position as to insure substantially complete discharge of material unless it is sticky or otherwise hard to discharge and produce the hammerlike blows or jars in a less degree. The rear or trailing end of each of the cams 78 has a cam surface 79 which extends below the outer periphery of the sprocket 58 and this also provides for reverse or clockwise travel of the conveyer mechanism 30 by lifting the flights over the cams 78 and 64. It is, of course, evident that the cam 78 is duplicated, one on each side of the conveyer mechanism 30 and as illustrated in Fig. 5 of the drawings and like the cam plates 75 they are positioned outwardly from the conveyer mechanism 30 a greater distance than cam 64.

In the form of conveyer illustrated, the material first travels along a horizontal path, then along a curved path to an upright or vertical path, though it is obvious that the conveyer housing 20 may have a wide variety of configurations during this travel of material through the working leg. If an open or skeleton type flight is employed, as distinguished from the preferred solid type, a continuous column of conveyed material will extend from the feed inlet to the discharge opening. When the material reaches the discharge chamber 54 it will tend to flow from the upper surface of the flights 32 since it is no longer confined and this action will be enhanced by the swinging of the flights 32 under the cams 67, 70, 76, etc., to insure a complete discharge of material as above described.

It will, of course, be obvious that it is well within the scope of my invention to utilize various combinations of the types of cams which I have shown and described to produce their combined effects in the discharge area of a conveyer. For example, it is within the scope of my invention to substitute for the cams 64, shown in Fig. 5, the cams 64 of Fig. 2 including the pivoted cams 76, or to make any other such substitution or rearrangement of the said cams described as may be desired.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention, what I now desire to secure by Letters Patent of the United States is:

1. In a conveyer, the combination of a casing including a head section having a working and a return leg associated therewith, a head shaft and sprocket in said head section, conveyer mechanism in said casing including a chain having trailing pivoted flights, said conveyer mechanism extending from said working leg over said sprocket and into said return leg, discharge chute means in said head section extending upwardly from said working leg and below said shaft to said return leg, and successive pairs of oppositely disposed cams above said discharge chute, each cam extending sidewardly inwardly from opposite sides of the casing, the pairs of cams adapted to carry said pivoted flights and by which they are tilted to discharging position as they are moved thereover by the chain, the first pair of cams having gradual leading edges and means pivoted thereto forming relatively abrupt trailing edges, the leading edge of the second pair of cams extending from adjacent the trailing edges of said first cams and having relatively abrupt trailing edges whereby said flights in passing over said successive pairs of cams drop from the first pair to the second pair, and in passing from the second pair are dropped therefrom to remove conveyed material not jarred therefrom as the flights drop from the first cams to the second cams, and the trailing edges of the second cams and the pivoted means of the first cams affording guide means for said flights permitting reversal of the direction of travel of said chain and flights.

2. In a conveyer, the combination of a casing including a head section having a working and a return leg associated therewith, a head shaft and sprocket in said head section, conveyer mechanism in said casing including a chain having trailing pivoted flights, said conveyer mechanism extending from said working leg over said sprocket and into said return leg, discharge chute means in said head section extending upwardly from said working leg and below said shaft to said return leg, and successive pairs of oppositely disposed cams above said discharge chute adapted to carry said pivoted flights and by which they are tilted to discharging position as they are moved thereover by the chain, the first pair of cams having gradual leading edges and means pivoted thereto forming relatively abrupt trailing edges, the leading edge of the second pair of cams extending from adjacent the trailing edges of said first cams and having relatively abrupt trailing edges whereby said flights in passing over said successive pairs of cams drop from the first pair to the second pair, and in passing from the second pair are dropped therefrom to remove conveyed material not jarred therefrom as the flights drop from the first cams to the second cams, and the trailing edges of the second cams and the pivoted means of the first cams affording guide means for said flights permitting reversal of the direction of travel of said chain and flights.

3. In a conveyer, the combination of a casing including a discharge section having a working leg associated therewith, a shaft in said discharge section, conveyer mechanism in said casing including a chain and trailing pivoted flights, said conveyer mechanism extending from said working leg over said shaft, chute means in said discharge section extending from said working leg below said shaft, and successive cams above said chute means adapted to carry said pivoted flights and by which they are moved to discharging position as they are moved thereover, the first cam having a gradual leading edge and a relatively abrupt trailing edge, the leading edge of the second cam extending from adjacent the trailing edge of said first cam and having a relatively abrupt trailing edge whereby said flights in passing over the successive cams drop from the first cam upon the second cam and in passing from the second cam are dropped therefrom to remove material not jarred therefrom as the flights drop from the first cam to the second cam, one of said cams including pivoted means forming the trailing edge thereof adapted to pivot and provide for reverse travel of said flights thereover.

4. In a conveyer, the combination of a casing including a discharge section having a working leg associated therewith, a shaft in said discharge section, conveyer mechanism in said casing including a chain and trailing pivoted flights, said conveyer mechanism extending from said working leg over said shaft, chute means in said discharge section extending from said working leg below said shaft, and successive cams above said chute means adapted to carry said pivoted flights and by which they are moved to discharging position as they are moved thereover, the first cam having a gradual leading edge and a relatively abrupt trailing edge, the leading edge of the second cam extending from adjacent the trailing edge of said first cam and having a relatively abrupt trailing edge whereby said flights in passing over the successive cams drop from the first cam upon the second cam and in passing from the second cam are dropped therefrom to remove material not jarred therefrom as the flights drop from the first cam to the second cam, each of said cams including pivoted means forming the trailing edge thereof adapted to pivot and provide for reverse travel of said flights thereover.

5. In a conveyer, the combination of a casing including a discharge section having a working leg associated therewith, a shaft in said discharge section, conveyer mechanism in said casing including a chain and trailing pivoted flights, said conveyer mechanism extending from said working leg over said shaft, chute means in said discharge section extending from said working leg below said shaft, and successive pivoted cams above said chute means adapted to carry said pivoted flights and by which they are moved to discharging position as they are moved thereover, the first cam providing a relatively abrupt trailing edge and being associated with means providing a gradual leading edge, the leading edge of the second cam extending from adjacent the trailing edge of said first cam and having a relatively abrupt trailing edge whereby said flights in passing over the successive cams drop from the first cam upon the second cam and in passing from the second cam are dropped therefrom to remove material not jarred therefrom as the flights drop from the first cam to the second cam and each of said pivoted cams being adapted upon reversal of direction of travel of said chain and flight mechanism to pivot and guide said flights thereover.

6. In a conveyer, the combination with a casing, of conveyer mechanism therein including a head shaft, a draft chain or the equivalent and trailing pivoted flights, and successive cams over which said flights move and by which they are tilted to discharging position, one of said cams being below said head shaft the other adjacent thereto, one of said cams including pivoted means adapted to pivot and provide for reverse travel of said flights thereover.

7. In a conveyer, the combination with a casing, of conveyer mechanism therein including a head shaft, a draft chain or the equivalent and pivoted flights, and successive cams over which said flights move and by which they are tilted to discharging position, one of said cams being below said head shaft the other adjacent thereto, one of said cams including pivoted means adapted to pivot and provide for reverse travel of said flights thereover.

STANLEY M. MERCIER.

REFERENCES CITED

The following references are of record in the file of this patent:

UNITED STATES PATENTS

| Number | Name | Date |
|---|---|---|
| 1,342,789 | Anderson | June 8, 1920 |
| 2,269,558 | Sinden | Jan. 13, 1942 |